United States Patent
Nishioka (10) Patent No.: US 9,503,958 B2
(45) Date of Patent: *Nov. 22, 2016

(54) PATH CONTROL DEVICE, PATH CONTROL SYSTEM, PATH CONTROL METHOD, AND NON-TRANSITORY COMPUTER READABLE MEDIUM

(75) Inventor: Jun Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1115 days.

This patent is subject to a terminal disclaimer.

(21) Appl. No.: 13/255,997

(22) PCT Filed: Mar. 26, 2010

(86) PCT No.: PCT/JP2010/002207
§ 371 (c)(1),
(2), (4) Date: Sep. 12, 2011

(87) PCT Pub. No.: WO2010/119627
PCT Pub. Date: Oct. 21, 2010

(65) Prior Publication Data
US 2012/0020222 A1 Jan. 26, 2012

(30) Foreign Application Priority Data
Apr. 16, 2009 (JP) .................... 2009-100008

(51) Int. Cl.
*H04W 28/10* (2009.01)
*H04W 40/12* (2009.01)

(52) U.S. Cl.
CPC .................................... *H04W 40/12* (2013.01)

(58) Field of Classification Search
CPC ............ H04L 45/28; H04L 45/22; H04L 47/10; H04W 40/12–40/16
See application file for complete search history.

(56) References Cited

U.S. PATENT DOCUMENTS

| 6,711,218 B2 * | 3/2004 | Dent | 375/341 |
| 2005/0099992 A1 * | 5/2005 | Sato | 370/350 |

(Continued)

FOREIGN PATENT DOCUMENTS

| JP | 2003069620 A | 3/2003 |
| JP | 2004282244 A | 10/2004 |

(Continued)

OTHER PUBLICATIONS

Japanese Office Action for JP Application No. 2011-509194 mailed on Jan. 28, 2014 with English Translation.

(Continued)

*Primary Examiner* — Khaled Kassim
*Assistant Examiner* — Zhaohui Yang (57) ABSTRACT

Provided are a path control device and a path control method for maintaining a constant communication quality between wireless links in a network including a plurality of wireless links with varying transmission rates. A path control device 900 for a plurality of wireless links connecting a plurality of communication devices includes an information management unit 901 that stores a correlation of communication quality between the wireless links; and a path selecting unit 902 that selects a path of a flow by using the correlation of communication quality between the wireless links. The path selecting unit 902 selects a path using the correlation of communication quality between the wireless links, thereby maintaining the communication quality of the entire path constant.

13 Claims, 9 Drawing Sheets

(56) References Cited

U.S. PATENT DOCUMENTS

| | | | |
|---|---|---|---|
| 2006/0126514 A1* | 6/2006 | Lee et al. | 370/238 |
| 2008/0040509 A1* | 2/2008 | Werb et al. | 709/242 |
| 2008/0219268 A1* | 9/2008 | Dennison | H04L 12/4625 370/395.2 |
| 2012/0176931 A1* | 7/2012 | Jetcheva et al. | 370/254 |

FOREIGN PATENT DOCUMENTS

| | | | |
|---|---|---|---|
| JP | 2005252452 A | 9/2005 | |
| JP | 2005535235 A | 11/2005 | |
| JP | 2009-507402 A | 2/2009 | |

OTHER PUBLICATIONS

International Search Report for PCT/JP2010/002207 mailed Jun. 29, 2010.

K. Kar et al., "Minimum Interference Routing of Bandwidth Guaranteed Tunnels with MPLS Traffic Engineering Applications", IEEE Journal of Selected Areas in Communications, vol. 18, No. 12, Dec. 2000, pp. 2566-2579.

* cited by examiner

| TIME | 102-105 | 102-103 | 103-105 | 103-104 | 102-104 | 104-105 |
|---|---|---|---|---|---|---|
| 1 | 32 QAM | 32 QAM | 32 QAM | 16 QAM | 16 QAM | 16 QAM |
| 2 | 32 QAM | 32 QAM | 32 QAM | 16 QAM | 16 QAM | 16 QAM |
| 3 | 16 QAM | 16 QAM | 16 QAM | 32 QAM | 16 QAM | 32 QAM |
| 4 | 32 QAM | 32 QAM | 32 QAM | 16 QAM | 16 QAM | 16 QAM |
| 5 | 16 QAM | 16 QAM | 16 QAM | 32 QAM | 16 QAM | 32 QAM |
| 6 | QPSK | QPSK | 16 QAM | 32 QAM | 32 QAM | 32 QAM |

PATH CONTROL DEVICE, PATH CONTROL SYSTEM, PATH CONTROL METHOD, AND NON-TRANSITORY COMPUTER READABLE MEDIUM

TECHNICAL FIELD

The present invention relates to a network including a plurality of wireless links, and more particularly, to a path control of wireless links using adaptive modulation.

BACKGROUND ART

In a cellular phone network, fixed wireless access (FWA) using a millimeter-wave band has been widely utilized. The communication quality of each wireless link is affected by radio environments such as a signal-to-noise ratio (SNR) and a carrier-to-interference-plus-noise ratio (CINR) of received signals. In this regard, adaptive modulation has been attracting attention in order to achieve a wider bandwidth of the wireless link. The adaptive modulation is a technique of adaptively searching and using a modulation method with the highest transmission efficiency depending on the radio conditions of the wireless link. The adaptive modulation technique can provide an optimum wireless communication depending on the radio environments and can improve the frequency efficiency.

In such a network, however, when a path control (for example, Non Patent Literature 1) as used in a wired network is applied, the network is affected by a variation in the transmission rate of each wireless link due to adaptive modulation, which affects the communication quality of traffic. In other words, a path through which traffic flows includes a plurality of wireless links, and the wireless links independently select a transmission rate by adaptive modulation. Accordingly, if a path including wireless links with different transmission rates is selected, the stability of the path itself deteriorates. In particular, since wireless links greatly depend on radio wave environments, it is considered that wireless links have a correlation with each other. Therefore, it is important to take into consideration a correlation of communication quality in a path control operation.

In a typical network using a plurality of wireless links, a normal path and a redundant path different from the normal path are set so as to maintain the communication quality. The redundant path is an extra path which is used in place of the normal path in case of occurrence of a failure, for example. Therefore, even in the case of setting the redundant path, it is necessary to take into consideration a correlation between wireless links so as to prevent the normal path and the redundant path from deteriorating at the same time.

Patent Literatures 1 and 2 propose a method for calculating a physical distance between wireless links as a spatial correlation coefficient and selecting a path with a small spatial correlation coefficient. However, these patent literatures focus only on the physical distance. Thus, there is a possibility that wireless links which are spatially close to each other and have no correlation of communication quality between the wireless links cannot be selected for the redundant path. There is another possibility that wireless links which are spatially distant from each other and have a high correlation of communication quality between the wireless links can be selected for the redundant path. Therefore, such a method is inadequate.

CITATION LIST

Patent Literature

[Patent Literature 1] Japanese Unexamined Patent Application Publication No. 2003-69620
[Patent Literature 2] Japanese Unexamined Patent Application Publication No. 2005-252452

Non Patent Literature

[Non Patent Literature 1] Koushik Kar et. al. "Minimum interference Routing of Bandwidth Guaranteed Tunnels with MPLS Traffic Engineering Applications", IEEE Journal of Selected Areas in Communications, Vol. 18, Issue 12, December 2000, pages 2566-2579

SUMMARY OF INVENTION

Technical Problem

A problem to be solved by the present invention resides in that deterioration in communication quality cannot be estimated upon setting of a path of a traffic flow, which may result in setting a path with which communication cannot be maintained. Another problem to be solved by the present invention resides in that a correlation of communication quality between a normally used path and a path prepared for backup is not considered, which may also result in deterioration of the communication quality and inability to maintain the communication.

It is an object of the present invention to achieve a path control based on a correlation of communication quality between wireless links in a network including a plurality of wireless links.

Solution to Problem

An exemplary aspect of the present invention is a path control device for a plurality of wireless links connecting a plurality of communication devices, the path control device including: information management means for storing a correlation of communication quality between the plurality of wireless links; and path selecting means for selecting a path of a flow using a correlation of communication quality between the plurality of wireless links.

Another exemplary aspect of the present invention is a path control system including: a plurality of communication devices that communicate with each other using a plurality of wireless links; and a path control device that selects a path of a flow using a correlation of communication quality between the plurality of wireless links.

Still another exemplary aspect of the present invention is a path control method for a network in which a plurality of communication devices communicate with each other using a plurality of wireless links, the path control method including: selecting a path of a flow using a correlation of communication quality between the plurality of wireless links.

Further another aspect of the present invention is a non-transitory computer readable medium storing a program for controlling a path of a network in which a plurality of communication devices communicate with each other using a plurality of wireless links, the program causing a computer to execute processing for selecting a path of a flow using a correlation of communication quality between the plurality of wireless links.

Advantageous Effects of Invention

The present invention has an advantageous effect of maintaining communication by selecting a path using a correlation of communication quality between wireless links.

DESCRIPTION OF EMBODIMENTS

Hereinafter, exemplary embodiments of the present invention will be described with reference to the drawings. To clarify the explanation, omissions and simplifications are made as necessary in the following description and the drawings. Throughout the drawings, components having the same structure or function and corresponding parts are denoted by the same reference numerals, and the description thereof is omitted.

In the present invention, a correlation of communication quality between wireless links is calculated and a path control is performed based on the correlation. For example, in the case of setting paths of a flow, wireless links having a high correlation are selected to set the path. Further, in the case of setting a redundant path corresponding to a normal path, wireless links having no correlation or wireless links having a negative correlation are selected for the redundant path, instead of selecting a wireless link having a positive correlation with a wireless link constituting the normal path.

The term "communication quality" of each wireless link herein described refers to a transmission rate of each wireless link, a modulation method used, a radio wave environment (for example, a bit error rate (BER)), or the like.

The normal path is a path used by any traffic during normal hours. The redundant path is a path used when the normal path cannot be used due to a failure or the like, or when the communication quality deteriorates, for example. The redundant path is set to maintain the safety of the communication.

Figure 1:
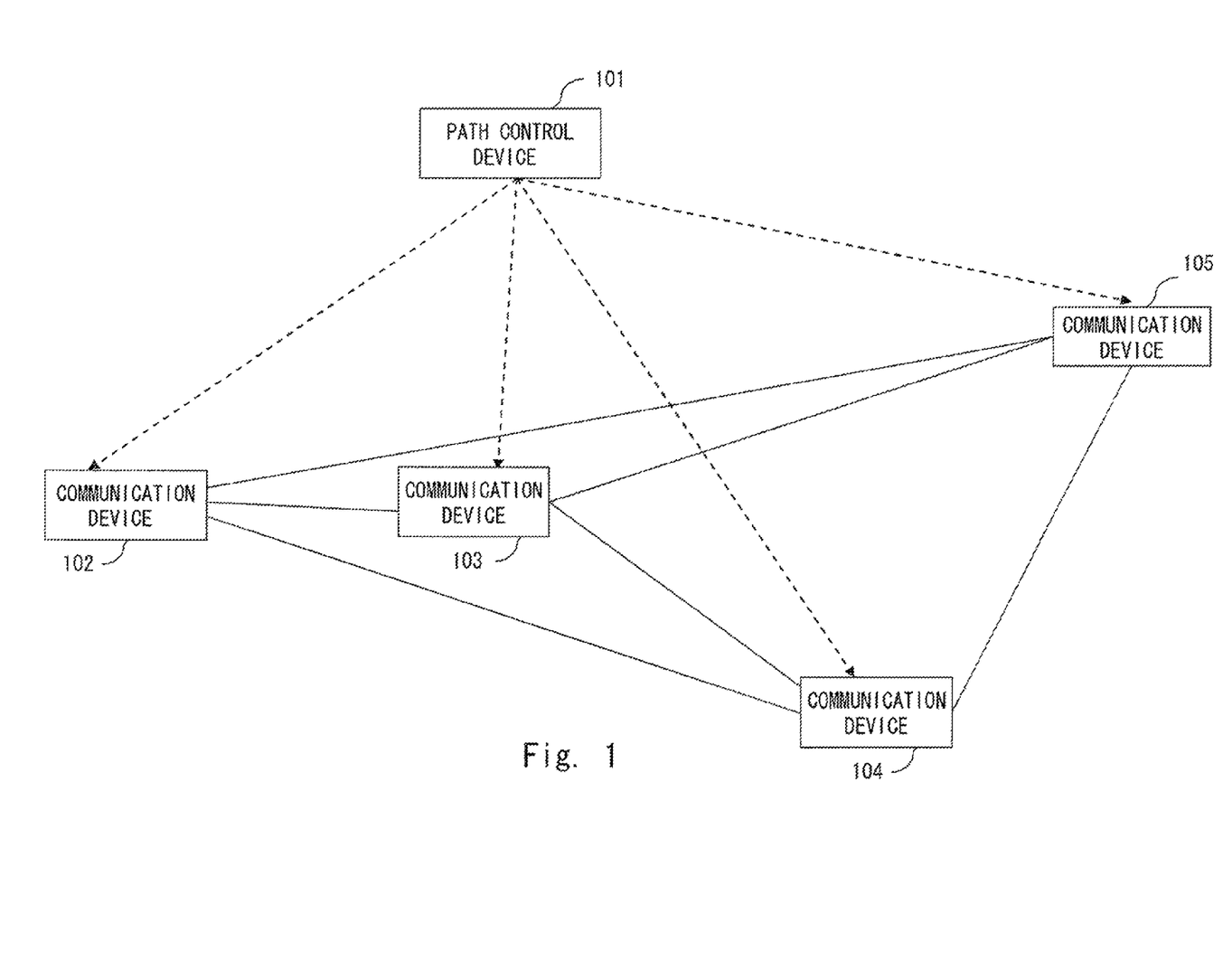
FIG. 1 is a diagram showing a network configuration for carrying out the present invention.

FIG. 1 shows a configuration example of a network to which a path control device of the present invention is applied. Referring to FIG. 1, the network includes a path control device 101 that performs a path calculation, and communication devices (such as a router or a switch) 102 to 105 that transfer packets using a plurality of wireless links. FIG. 1 shows four communication devices by way of example, but the number of communication devices is not limited thereto. A description will be made assuming that the communication devices 102 to 105 are devices that relay packets to other communication devices (for example, a router, a switch, or a mobile terminal). Reference numerals 102 to 105 are used to express paths between the communication devices 102 to 105 using wireless links. For example, a path between the communication devices 102 and 105 is expressed as "link 102-105" (in the case of using one wireless link) or as "link 102-104-105" (in the case of using two wireless links).

In the network shown in FIG. 1, for example, assume that when any traffic is allowed to flow from the communication device 102 to the communication device 105, the link 102-105 is selected for the normal path. In the case of setting a redundant path corresponding to the normal path, a correlation of modulation method between each wireless link as a candidate for the redundant path and the wireless link 102-105 on the normal path is obtained. Further, wireless links having the lowest correlation are selected for the redundant path. For example, assume that wireless links having a high correlation with the link 102-105 are calculated as a link 102-103 and a link 103-105; a wireless link having a low correlation with the link 102-105 is calculated as a link 102-104; and a wireless link having a negative correlation with the link 102-105 is calculated as a link 104-105. In this case, the path of the link 102-104-105, which is a combination of a wireless link having a low correlation and a wireless link having a negative correlation, is selected for the redundant path of the link 102-105.

As a result, a path having a low correlation of communication quality with the normal path is selected for the redundant path. This prevents the communication qualities of the normal path and the redundant path from deteriorating at the same time, and avoids simultaneous changes of the modulation methods applied to the both paths to a low transmission rate.

This prevents the normal path and the redundant path from simultaneously using a modulation method with a transmission rate lower than the current transmission rate. For example, if the transmission rate of the normal path is lowered, the transmission rate of the redundant path having a low correlation of communication quality remains constant, or, to the contrary, links having improved transmission rates are used for the redundant path. Accordingly, the traffic flowing through the normal path is detoured to the redundant path, thereby securing the communication quality of the traffic.

Figure 2:
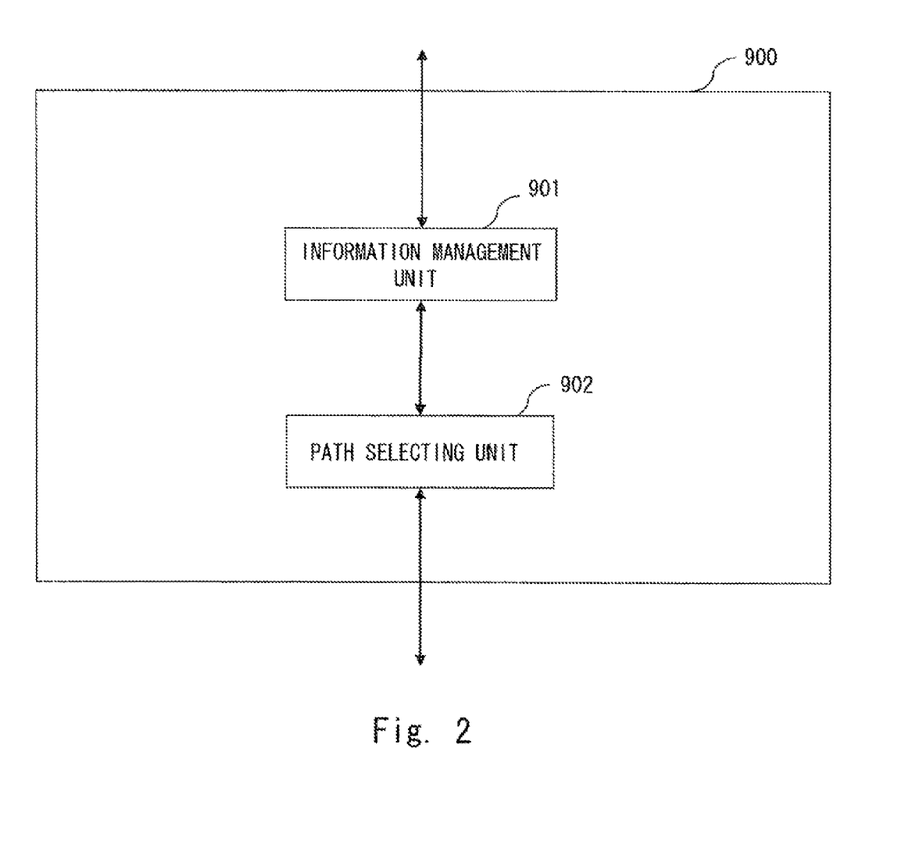
FIG. 2 is a block diagram showing a configuration example of a path control device according to the present invention.

Next, a path control device that implements a path control will be described. FIG. 2 shows a configuration example of a path control device (path control unit) 900.

The path control device 900 includes an information management unit (information management means) 901 and a path selecting unit (path selecting means) 902.

The information management unit 901 manages information about a correlation of communication quality between a plurality of wireless links. The correlation is used by the plurality of communication devices 102 to 105. The information management unit 901 also manages information necessary for controlling paths of a flow. For example, the information management unit 901 retains and manages information about the communication quality for use in calculating the correlation, and information about a path used when the path selecting unit 902 selects a path. The information management unit 901 will be described in detail later in a first exemplary embodiment with reference to FIG. 3. Further, the information management unit 901 may have a function of calculating a correlation of communication quality between a plurality of wireless links by using communication qualities received from a plurality of communication devices, or a function of receiving results (for example, a correlation coefficient) of calculating the correlation of communication quality from the plurality of communication devices and retaining the results.

The path selecting unit 902 selects (searches) paths of a flow by using the correlation managed by the information management unit 901. The selected path of the flow is notified to the plurality of communication devices 102 to 105. The path selected based on the correlation is set to the network. The selected path of the flow may be notified in accordance with an instruction from the path selecting unit 902. Alternatively, the component to which the path of the flow selected by the path selecting unit 902 is output may notify another communication device of the selected path of the flow.

Paths of a flow herein described refer to paths through which any traffic flows, and include a normal path and a redundant path. The path selecting unit 902 selects at least a redundant path by use of a correlation. A normal path may be selected using a correlation or by other methods such as a method of selecting a vacant area, for example. Detailed descriptions of other methods are herein omitted. In the case of using a plurality of wireless links for the normal path, the correlation between the wireless links is preferably taken into consideration. When the correlation between the wireless links is high, similar transmission rates can be used, which makes it possible to stabilize the entire path.

The path control device 900 shown in FIG. 2 may be used as a component to be mounted in the path control device 101. The path control device 900 may be mounted in the communication devices 102 to 105. Alternatively, the path control device 900 may be connected to the communication devices 102 to 105.

Hereinafter, best modes for carry out the present invention will be described in detail with reference to the drawings.

First Exemplary Embodiment

Figure 3:
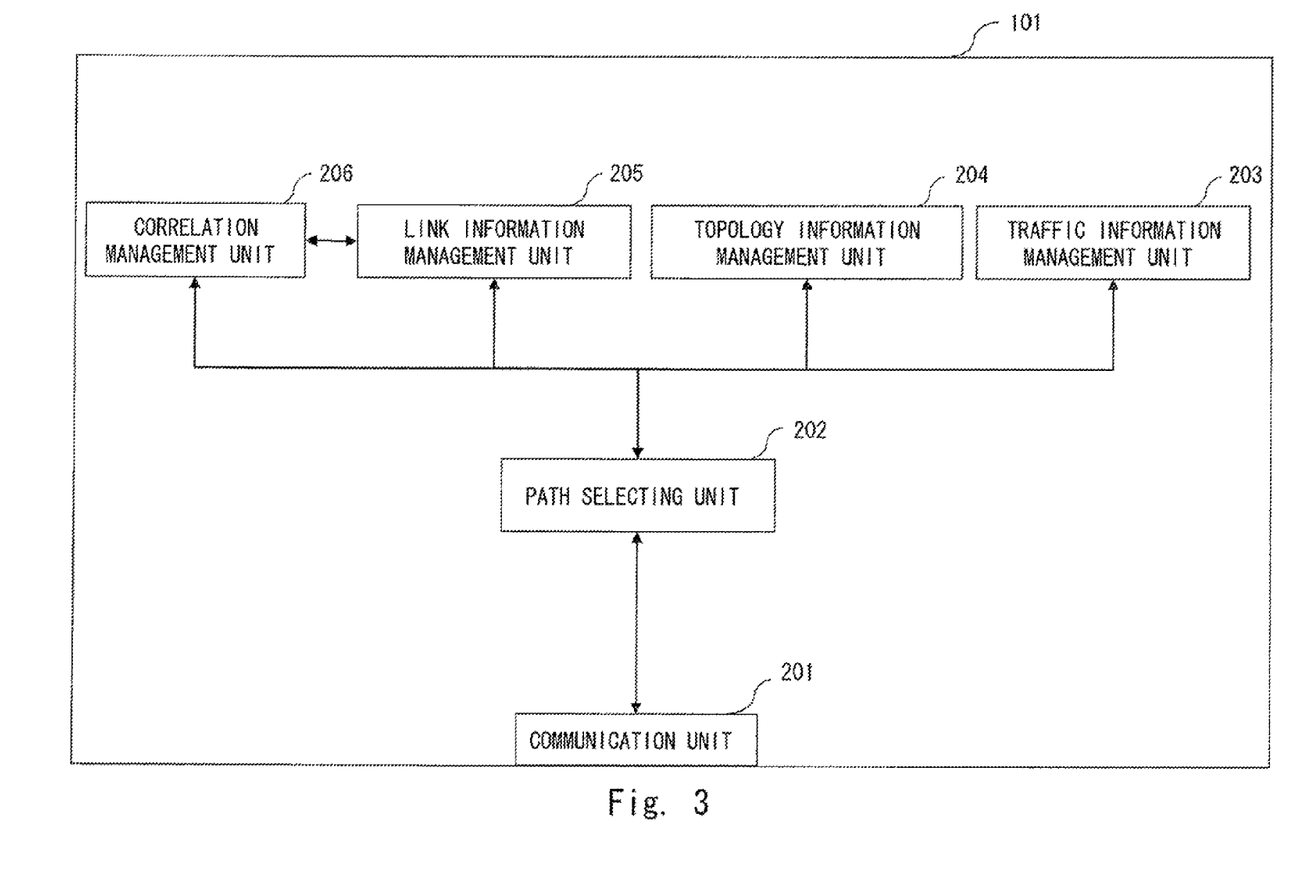
FIG. 3 is a block diagram showing a configuration example of a path control device according to a first exemplary embodiment of the present invention.

FIG. 3 is a block diagram showing a configuration example of a path control device of a first exemplary embodiment.

As shown in FIG. 3, the path control device 101 includes a communication unit 201, a path selecting unit 202, a traffic information management unit 203, a topology information management unit 204, a link information management unit 205, and a correlation management unit 206.

The path selecting unit 202 has a function of collecting information, a function of selecting a path, and a function of setting a path. Specifically, as for the function of collecting information, the path selecting unit 202 collects traffic information indicating where and how much the traffic flows in the network, and network information such as conditions and performances of links constituting the network. As for the function of selecting a path, the path selecting unit 202 selects a path, through which any traffic flows, by use of a correlation. As for the function of setting a path, the path selecting unit 202 sets a path to the network by notifying the communication devices within the network of the selected path.

The traffic information management unit 203 manages traffic information including a transmission source, a destination, a bandwidth to be used, paths, or the like of the traffic flowing in the network.

The topology information management unit 204 manages network information including a connection relationship (adjacency relationship) between nodes, which represents the configuration of the network, and conditions of wireless links.

The link information management unit 205 manages link quality information including a history of information indicating a radio wave environment of each wireless link, modulation modes (histories of modulation modes used) used at present and in the past, and an estimated modulation mode. The information indicating a radio wave environment includes one or more of the BER, SNR, and CINR.

The correlation management unit 206 calculates a correlation of communication quality between wireless links by using the information managed by the link information management unit 205, and holds the calculation results. The correlation management unit 206 transfers the link quality information and the correlation coefficient to the link information management unit 205.

The functions of the path selecting unit 202 will be described in detail below with reference to the components shown in FIG. 3. The path selecting unit 202 obtains, from the traffic information management unit 203, the traffic information such as a transmission source, a destination, and a bandwidth to be used of the traffic flowing in the network. Further, the path selecting unit 202 obtains the network information from the topology information management unit 204, and also obtains the link quality information from the link information management unit 205. The path selecting unit 202 cooperates with the correlation management unit 206, and sets paths in consideration of the correlation of communication quality between the wireless links, thereby controlling the paths through which the traffic flows. Thus, the selection of paths using the correlation of communication quality between wireless links allows the communication to be maintained. For example, deterioration of the redundant path can be avoided in the same manner as in the communication path, and the communication quality of the traffic can be maintained.

Referring to FIG. 3, the path selecting unit 202 implements the functions included in the path selecting unit 902 shown in FIG. 2. The topology information management unit 204, the traffic information management unit 203, the link information management unit 205, and the correlation management unit 206 implement the functions included in the information management unit 901 shown in FIG. 2.

Figure 4:
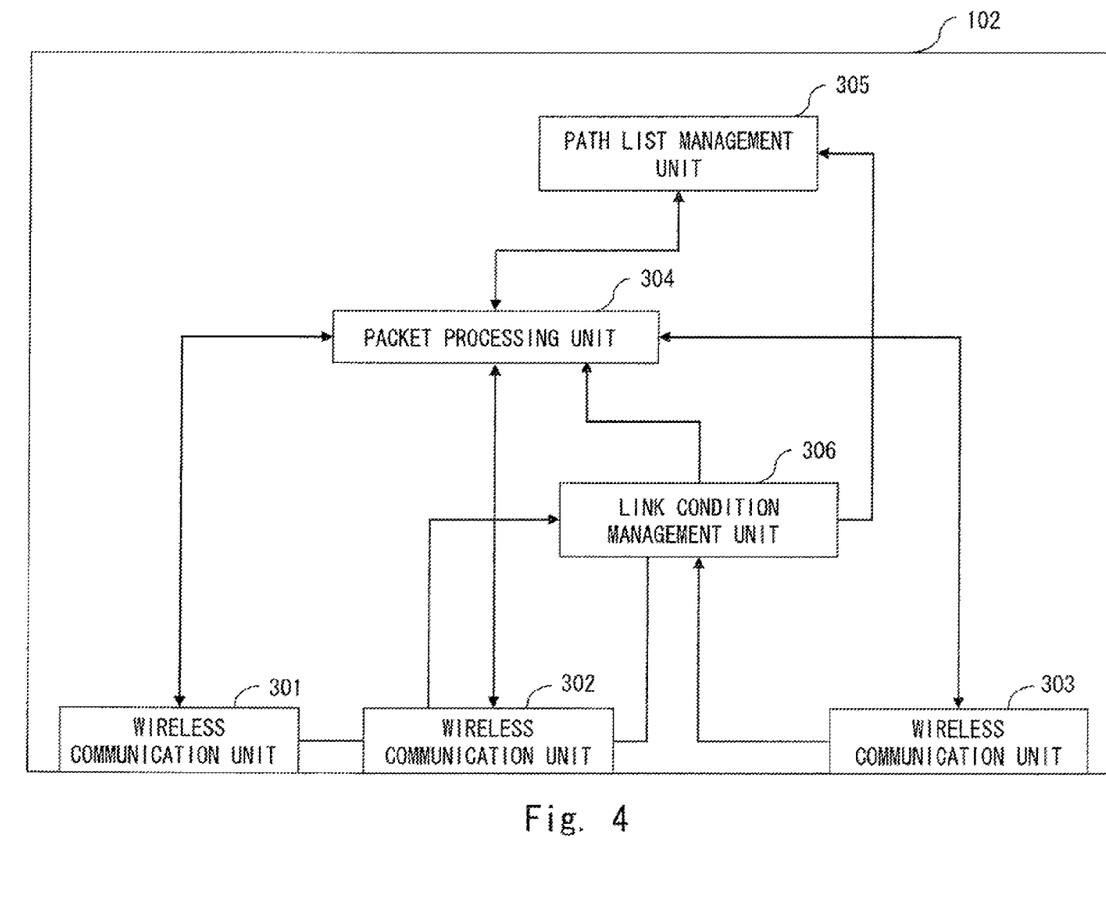
FIG. 4 is a block diagram showing a configuration example of a communication device according to the first exemplary embodiment of the present invention.

Next, the configuration of the communication devices 102 to 105 will be described. The communication device 102 is herein described by way of example, but the communication devices 103 to 105 also have the same configuration. FIG. 4 shows a configuration example of the communication device 102. The communication device 102 includes wireless communication units 301 to 303, a packet processing unit 304, a path list management unit 305, and a link condition management unit 306.

The packet processing unit 304 has functions of performing processing for transferring packets, updating its own path list, and notifying the path control device of the link information such as the BER of each wireless link managed by the own unit, the modulation mode used, and the degree of stability at which a frequency band can be used.

The path list management unit 305 manages its own path list and appropriately updates the path list in response to a notification from the path control device 101.

The link condition management unit 306 manages the link information such as the BER of each link managed by the own unit and the modulation mode used.

Figure 5:
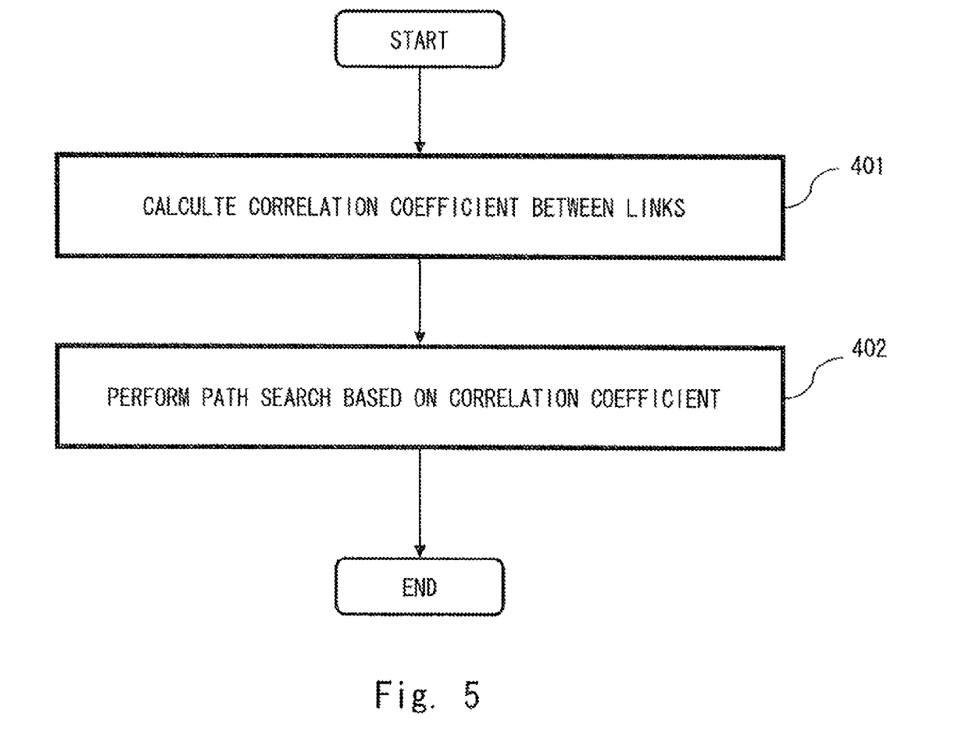
FIG. 5 is a flow chart showing an operation example for setting a path of a flow using a correlation in path control processing according to the first exemplary embodiment of the present invention.

Next, a path control operation will be described. FIG. 5 shows a basic path selection operation. In the path control device 101, the correlation management unit 206 calculates a correlation coefficient between links (step 401), and the path selecting unit 202 performs a path search based on the correlation coefficient (step 402). The present invention implements the path control using the procedure shown in FIG. 5 even in the cases of setting a normal path and setting a redundant path of a flow.

Figure 6:
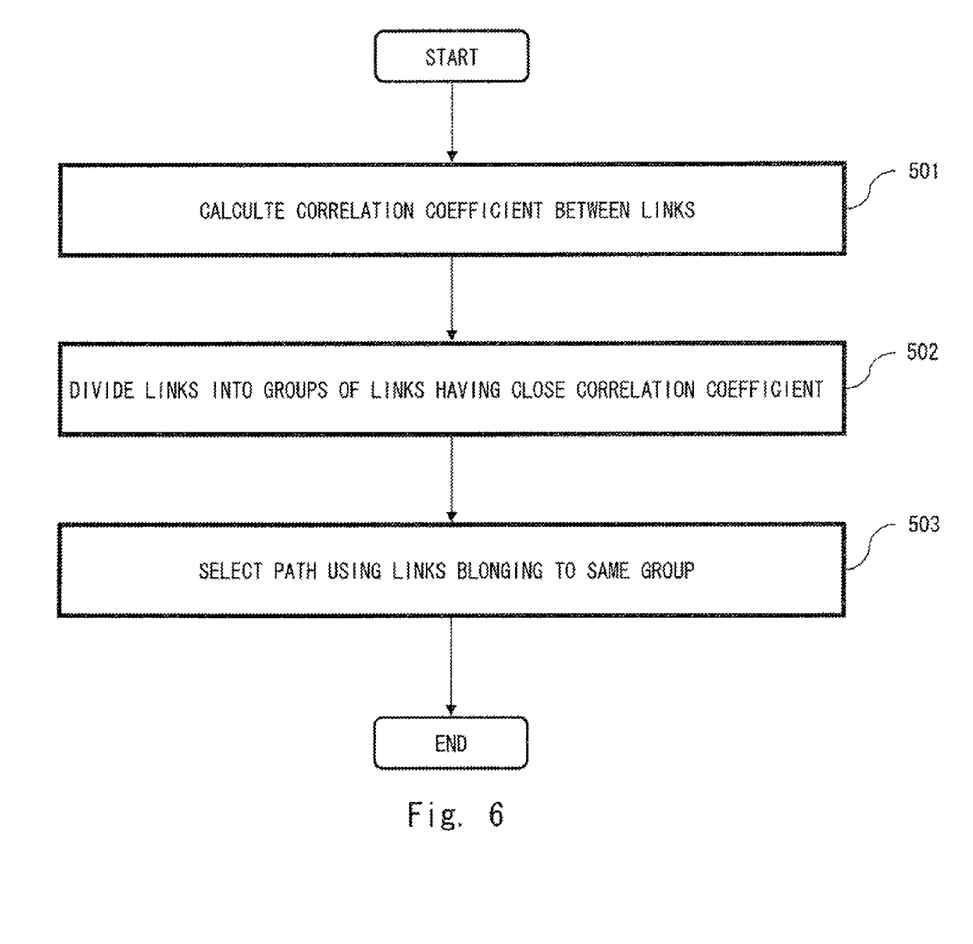
FIG. 6 is a flow chart showing an operation example for setting a normal path in the path control processing according to the first exemplary embodiment of the present invention.

Specifically, in the case of setting a normal path of a flow, the procedure shown in FIG. 6 is carried out. First, the correlation management unit 206 calculates a correlation coefficient between wireless links (step 501). For example, the correlation management unit 206 selects one candidate path as a normal path, and calculates a correlation coefficient between a wireless link constituting the selected path and another wireless link. The magnitude of the correlation between the wireless links can be detected using the calculated correlation coefficient.

Next, the path selecting unit 202 creates a group of selected wireless links having a high correlation based on the value of the correlation coefficient (step 502), and selects paths of a flow using the links belonging to the same group (step 503). Whether the links belong to the same group or not is determined depending on whether the correlation coefficient falls within a predetermined condition. Examples of the condition may include a condition in which the links have a positive correlation or a negative correlation, and a condition in which links having a correlation coefficient in a range of given values are classified into the same group.

The selection of a path using wireless links having a high correlation makes it possible to form a normal path using links whose communication qualities change in the same manner. This facilitates prediction of a change in communication quality of the entire path.

Figure 7:
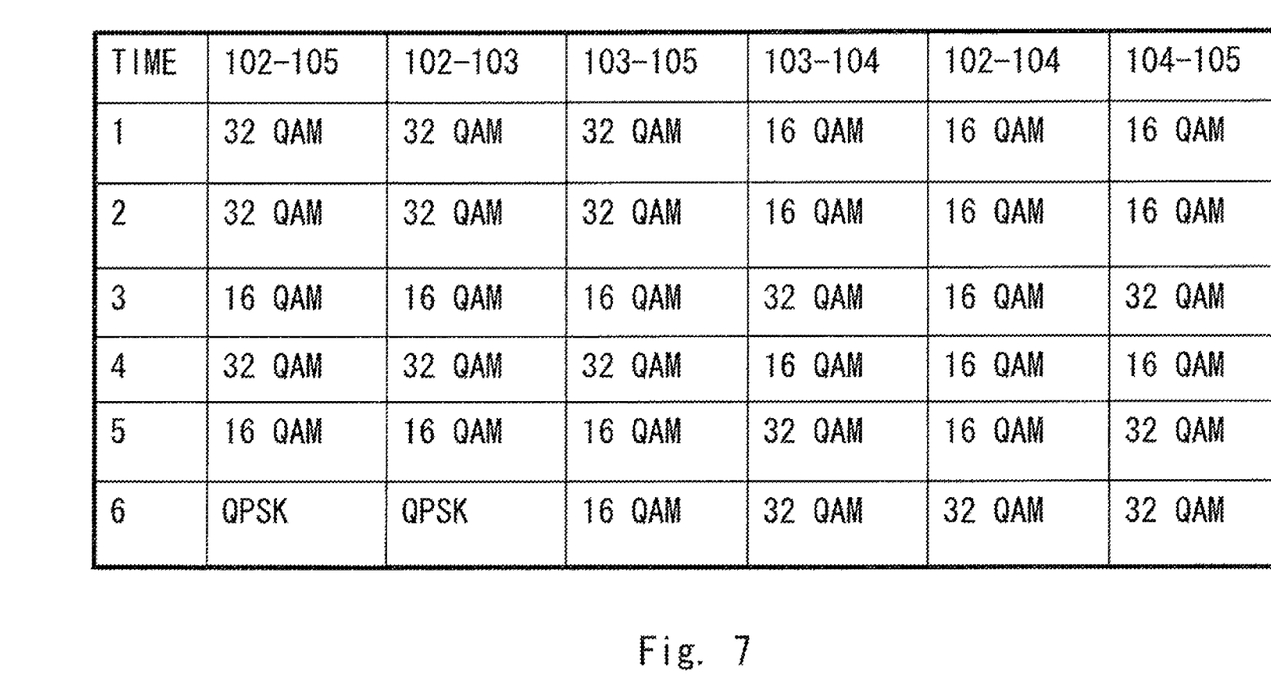
FIG. 7 is a table showing modulation methods used by wireless links.

Here, specific calculation of a correlation coefficient using information (a modulation method in this case) about the communication quality of wireless links will be described. For example, assume that modulation methods used by wireless links are given as shown in FIG. 7. The correlation management unit 206 correlates a modulation method QPSK-32 QAM with each of values 1 to 3, and treats the modulation method used by each wireless link until the present time as time-series data, thereby calculating a correlation coefficient. Specifically, the correlation coefficient is calculated using Formula (1) given below by correlating the value 1 with QPSK, the value 2 with 16 QAM, and the value 3 with 32 QAM.

$$\Sigma(x\_i-X)(y\_i-Y)/\sqrt{(\Sigma(x\_i-X)^2)}/\sqrt{(\Sigma(y\_i-Y)^2)} \quad (1)$$

where each of x_i and y_i represents i-th (i is an integer satisfying i>0) time-series data, and each of X and Y represents an average of the time-series data.

Assuming that time-series data is created and correlation coefficients are calculated based on FIG. 7, for example, correlation coefficients between the link 102-105 and other links are obtained as follows. At this time, the correlation coefficients are calculated by substituting the value of each of other links into x_i and substituting the value of the link 102-105 into y_i in Formula (1).

Link 102-103: 1.0
Link 103-105: 0.89
Link 103-104: −0.89
Link 102-104: −0.8
Link 104-105: −0.89

Each correlation coefficient has a value within the range of 1 to −1. A value close to 1 indicates a higher positive correlation. A value close to 0 indicates a lower correlation. A value close to −1 indicates a higher negative correlation.

The calculation of correlation coefficients between wireless links enables classification into a first group of the link 102-103, the link 103-105, and the link 102-105, which have a positive correlation, and a second group of the link 103-104, the link 102-104, and the link 104-105, which have a negative correlation, according to the magnitude of the correlation. Considering a path between the communication device 102 and the communication device 104, the link 102-104, a link 102-103-104, and a link 102-105-104 are considered as candidates. However, the link 102-103-104 and the link 102-105-104 cannot be used because the links are formed of wireless links belonging to different groups. Accordingly, only the link 102-104 can be used for the path.

In the case of setting a redundant path, a correlation coefficient of transmission rate between each wireless link on the normal path and another wireless link is first calculated. Then, the redundant path is determined so that the correlation with each wireless link constituting the normal path or the correlation with the entire normal path has a given correlation or lower. At this time, a condition may be set that both the correlation with each wireless link constituting the normal path and the correlation with the entire normal path have a given correlation or lower.

Next, a path control including an admission control will be described. The operation of the path selecting unit 202 including the admission control is shown in the flow chart of FIG. 8.

Figure 8:
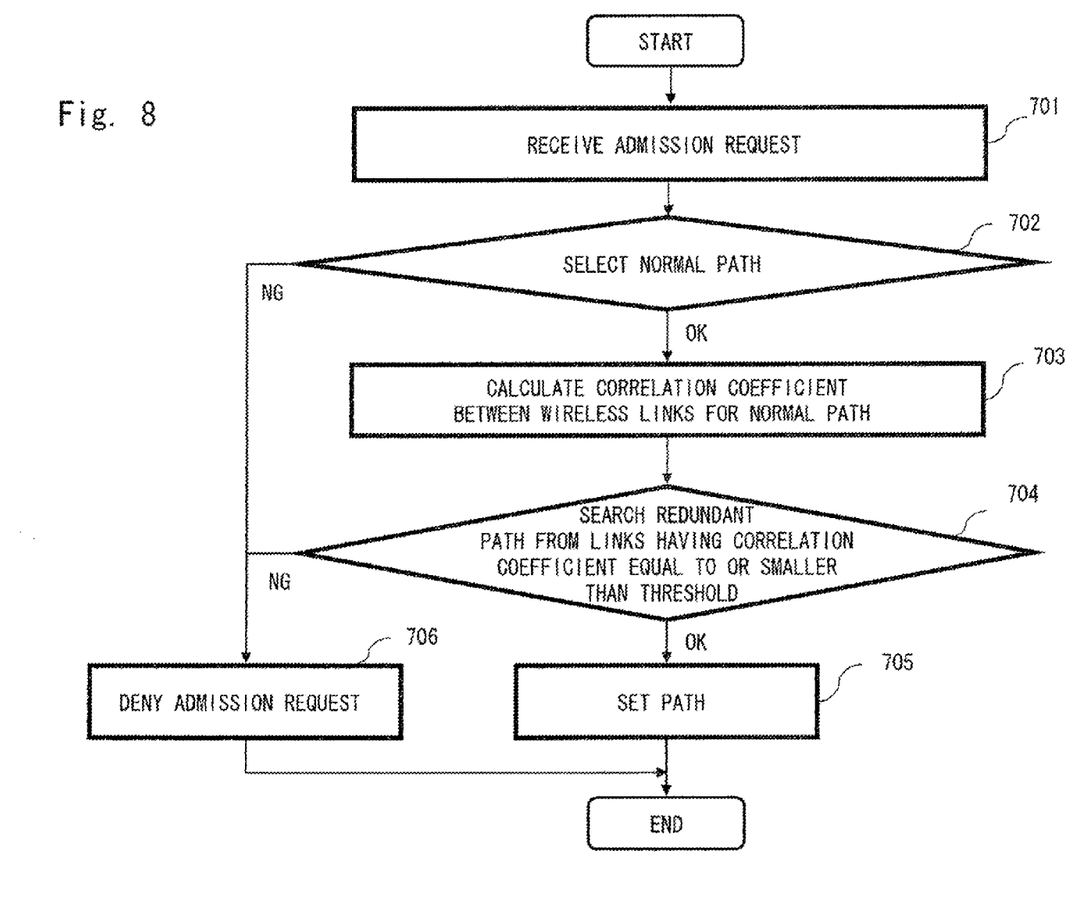
FIG. 8 is a flow chart showing an operation example for performing an admission control and setting paths including a redundant path in the path control processing according to the first exemplary embodiment of the present invention.

First, the path control device 101 receives an admission request from a device used by a network administrator or a person who tries to cause traffic to flow (step 701). The path control device 101 selects a normal path in response to the admission request (step 702). The normal path is selected by the correlation management unit 206 and the path selecting unit 202 according to the procedure shown in FIG. 6, for example.

Next, the path control device 101 calculates a correlation coefficient between each wireless link and the wireless link used for the normal path (step 703). Specifically, the correlation management unit 206 calculates a correlation coefficient between each wireless link of the normal path and each of other wireless links by using Formula (1) (corresponding to step 401 in FIG. 4). Next, the path selecting unit 202 of the path control device 101 searches a redundant path from the wireless links having a correlation coefficient equal to or smaller than a predetermined threshold (step 704).

When the search for the redundant path is successful (OK in step 704), the path selecting unit 202 sets the normal path and the redundant path to allow the admission request (step 705). Specifically, the path selecting unit 202 sends a message of path information, which indicates traffic and a path through which the traffic is to follow, to each of the communication devices 102 to 105 on the searched path, and updates the path list. This allows the traffic flowing through the network to follow the searched path.

Meanwhile, in step 702 or step 704, if the path selecting unit 202 has failed to select the path (NG in step 702 or NG in step 704), the admission request is defined (step 706). At this time, the path control device 101 notifies the device having sent the request of the denial of the admission request.

Here, the admission control shown in FIG. 8 is described using a history of each modulation method shown in FIG. 7. In the case where the link 102-105 is selected for the normal path and the modulation method used at present or in the past by each wireless link is given as shown in FIG. 7, the calculation of the correlation coefficient in step 703 of FIG. 8 and the search for the redundant path in step 704 of FIG. 8, which are carried out by the path selecting unit 202, will be described below.

As in the description with reference to FIG. 7, the modulation method QPSK-32 QAM is correlated with each of the values 1 to 3, and the modulation method used by each wireless link is treated as time-series data. In the case of calculating correlation coefficients, correlation coefficients between the link 102-105 used for the normal path and other links are obtained as follows.

Link 102-103: 1.0
Link 103-105: 0.89
Link 103-104: −0.89
Link 102-104: −0.8
Link 104-105: −0.89

Assuming herein that the upper limit of each correlation coefficient between the links that can be used for the redundant path is 0.25, the link 102-104 and the link 104-105 can be selected for the redundant path. However, the link 102-103 and the link 103-105 cannot be used for the redundant path. As a result, the path of the link 102-104-105 is selected as the redundant path.

The present invention can also be carried out in a mode in which wired links are mixed with wireless links. Furthermore, the present invention can be implemented even in the case where a certain communication device has the path control function (for example, the path control device 900 shown in FIG. 2, or components of the path control device 101 shown in FIG. 3 except the communication unit 201). Moreover, a plurality of path control devices may be present in a dispersed manner and operated. In this case, one of the path control devices disposed at different positions may carry out the path control, and may notify the communication devices included in the network of the path information.

More alternatively, the path control device may be connected to a given communication device. In this case, the path control device notifies communication devices included in the network of the path information through the connected communication device.

Second Exemplary Embodiment

Figure 9:
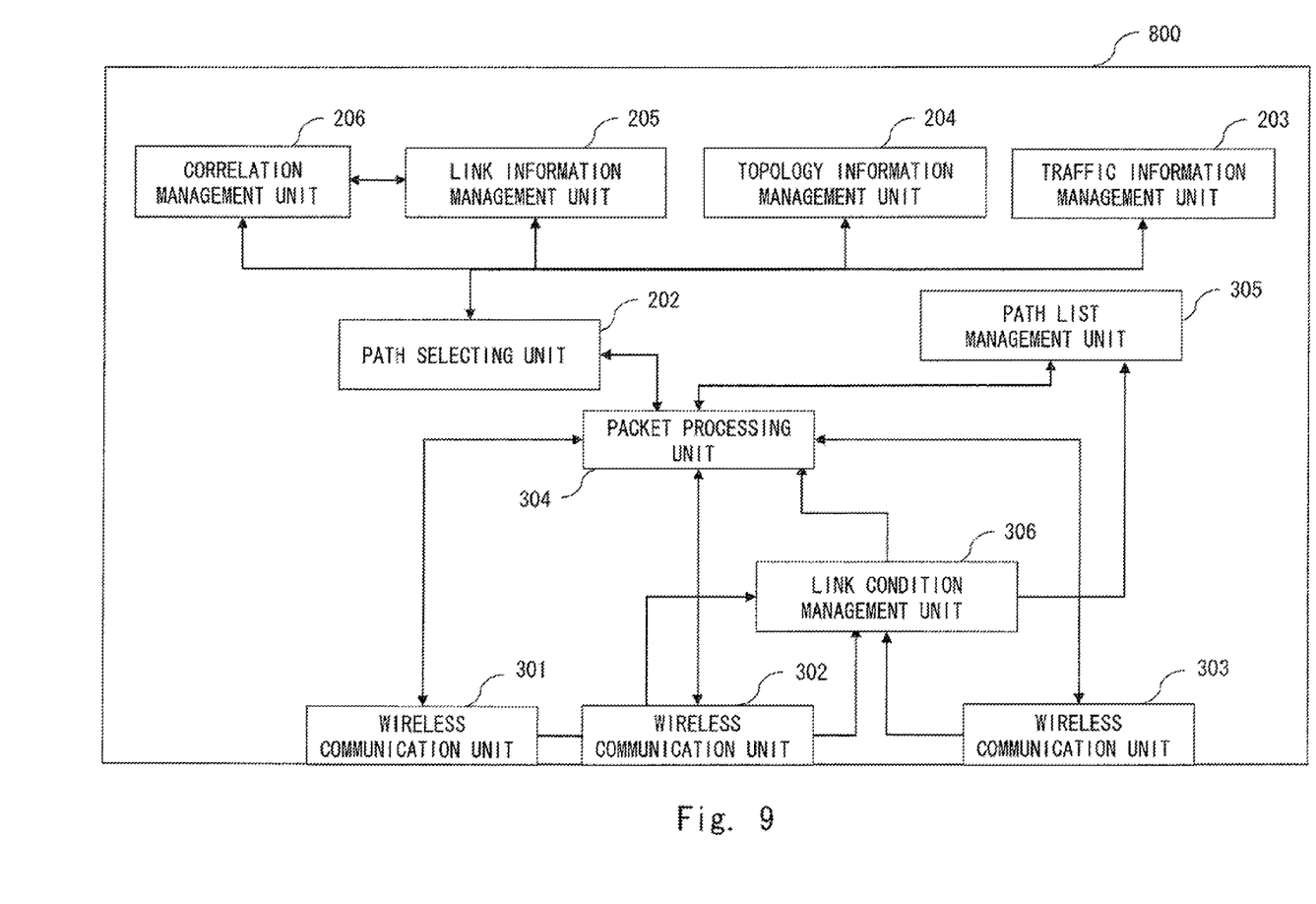
FIG. 9 is a block diagram showing a configuration example of a communication device having a function of a path control device.

An exemplary embodiment in which each communication device has a path control function and performs a path control in a distributed manner will be described as a second exemplary embodiment of the present invention. FIG. 9 shows a configuration example of a communication device having the path control function. The configuration example shown in FIG. 9 includes the path selecting unit 202, the traffic information management unit 203, the topology information management unit 204, the link information management unit 205, and the correlation management unit 206, in addition to the functions of the communication device shown in FIG. 4. Components denoted by the same reference numerals as those of FIG. 3 or 4 have similar functions, so the description thereof is omitted.

A communication device 800 shown in FIG. 9 may be replaced with each of the communication devices 102 to 105 shown in FIG. 1. In this case, the communication device 800 may be replaced with one of the plurality of communication devices or may be replaced with two or more communication devices.

In this exemplary embodiment, a communication device having received an admission request performs path control processing. In the case where the plurality of communication devices include the path control function, any one of the communication devices receives the admission request. The communication device 800 receives the message of the admission request through the wireless communication units 301 to 303, and sends the admission request from the packet processing unit 304 to the path selecting unit 202. The path selecting unit 202 performs path control processing in response to the received admission request. The operation of path control processing is similar to that of the first exemplary embodiment, so the description thereof is omitted. In this exemplary embodiment, notification of path information to other communication devices and exchange of traffic information are carried out after the path control processing.

Third Exemplary Embodiment

Each of the above exemplary embodiments has exemplified the case of calculating a correlation using a history of a modulation mode, specifically, a modulation mode used in the past in each wireless link. The correlation may be calculated using a history of information indicating a radio wave environment, specifically, information indicating a radio wave environment used in the past in each wireless link, instead of using the modulation mode. The information indicating a radio wave environment includes BER, SNR, or CINR, for example. The correlation may be calculated using one or a combination of them.

Alternatively, the correlation may be calculated using a combination of a history of a modulation mode used in the past and a history of information indicating a radio wave environment used in the past. More alternatively, a history of communication quality including the present one may be used.

Compared with the modulation mode that is typically changed by adaptive modulation, the radio wave environment specified by BER or the like has a small variation in link bandwidth. Accordingly, in the case of using adaptive modulation, it is expected to select wireless links used depending on the variation in bandwidth, compared to the case of performing a path control using the radio wave environment.

For example, a technique is known in which, in wireless links using the adaptive modulation technique, a path is set by predicting (estimating) the modulation mode to be used by the wireless links in the future based on the history or the like of the modulation method used in the past. In the case of predicting the modulation mode, the history of the modulation mode used in each of exemplary embodiments, or the history of a change in the modulation mode can be used. As a result, it is expected that more appropriate prediction can be made.

Fourth Exemplary Embodiment

The path control functions (components shown in FIG. 2 or 3 except the wireless communication unit 301) described in each of the above exemplary embodiments can be implemented using a program. A device (for example, a computer)

for carrying out path processing includes a central processing unit (CPU) and a memory for loading a program. The program is loaded into the memory in the device that carries out the path control functions, and an instruction set included in the program is executed under the control of the central processing unit (CPU). The program may be recorded in a memory (non-volatile memory) in the device, or may be recorded in a recording medium that can be read by the device.

The program includes at least an instruction set for causing the device to execute the following procedure: processing for calculating a correlation of communication quality between a plurality of wireless links; processing for selecting a path of a flow using the correlation calculated; and processing for notifying a plurality of communication devices of the selected path of the flow. The program is not limited to these processings, but also may include an instruction set for achieving the path control processing described each of the above exemplary embodiments.

The program can be stored in various types of non-transitory computer readable media and supplied to a computer. Examples of the non-transitory computer readable media include various types of tangible storage media. Examples of non-transitory computer readable media include magnetic recording media (for example, flexible disks, magnetic tapes, and hard disk drives), magneto-optical media (for example, magneto-optical disks), read-only memories (CD-ROMs), CD-Rs, CD-R/Ws, and semiconductor memories (for example, mask ROMs, programmable ROMs (PROMs), erasable PROMs (EPROMs), flash ROMs, and random access memories (RAMs)). The program may be stored in various types of transitory computer readable media to be supplied to a computer. Examples of the transitory computer readable media include electric signals, light signals, and electromagnetic waves. The transitory computer readable media allow the program to be supplied to a computer through a wired communication path such as an electric wire or an optical fiber, or through a wireless communication path.

Fifth Exemplary Embodiment

Hereinafter, a path control processing operation using a specific correlation coefficient will be described. Exemplary embodiments described below can be carried out by the path control device shown in FIG. 3 or the communication device shown in FIG. 9. Each exemplary embodiment will be described using specific values assuming that the communication devices 102 to 105 shown in FIG. 1 are arranged on a network.

As a fifth exemplary embodiment of the present invention, an example will be described in which a correlation between links is calculated by a method different from that of the first exemplary embodiment. As in the first exemplary embodiment, assume that the modulation methods used by wireless links are given as shown in FIG. 7. In this exemplary embodiment, a correlation is calculated using time-series data obtained by correlating a notification with a change in the modulation method used by each wireless link, instead of using values correlated with the modulation method. Specifically, a history of a change in the modulation method used by each wireless link during a period of times t−1 to t is created as time-series data. For example, when the modulation method changes from 16 QAM to 32 QAM during the period of times t−1 to t, the value 1 is set. When the modulation method changes from 16 QAM to QPSK, the value −1 is set. When the modulation method remains 16 QAM, the value 0 is set. In the case of the link 102-105, when a change in the used modulation method is treated as time-series data, (0, −1, 1, −1, −1) is obtained. Correlation coefficients are calculated using Formula (1) in the same manner as in the first exemplary embodiment.

When the link 102-105 is set for a normal path, correlation coefficients of a change between the link 102-105 and other links are obtained as follows.
Link 102-103: 1.0
Link 103-105: 0.87
Link 103-104: −0.87
Link 102-104: −0.38
Link 104-105: −0.87.

For example, when a condition is set in which a redundant path is selected from paths satisfying a correlation threshold of 0.25 or less, the link 102-104-105 are selected for the redundant path.

Sixth Exemplary Embodiment

A sixth exemplary embodiment describes a case where a normal path is formed of a plurality of wireless links. In the case of setting a redundant path, a correlation with the entire normal path is calculated to thereby set the redundant path. For example, assume that the link 102-104-105 is set as the normal path. In this case, since the normal path is formed of a plurality of links, time-series data of the entire path is created by a combination of time-series data of each link. Specifically, when the path is formed of links A and B, assuming that time-series data of the link A is represented by M_A and time-series data of the link B is represented by M_B, the time-series data of the entire path is determined as Min (M_A, M_B).

When the time-series data is creased in the same manner as in the fifth exemplary embodiment, the link 102-104 constantly uses a modulation method lower than that for the link 104-105, so that the same data as that of the link 102-104 is obtained for the entire path. The correlation coefficients between each wireless link and the normal path are obtained as follows:
Link 102-105: −0.45
Link 102-103: −0.45
Link 103-104: 0.447
Link 103-105: −0.87.

Assuming that the correlation threshold is 0.25, both the paths of the link 102-105 and the link 102-103-105 can be used for the redundant path. For example, when links with a smaller number of hops are given priority, the link 102-105 is selected for the redundant path.

Seventh Exemplary Embodiment

A seventh exemplary embodiment describes a case of calculating a correlation between wireless links using the BER as information indicating a radio wave environment. For example, assume that the BER of each link is given as shown below. Here, six pieces of information are presented as histories of the past BER.
Link 102-105: {$10^{-5}$, $10^{-6}$, $10^{-6}$, $10^{-5}$, $10^{-5}$, $10^{-6}$}
Link 102-103: {$10^{-5}$, $10^{-6}$, $10^{-6}$, $10^{-5}$, $10^{-5}$, $10^{-6}$}
Link 103-105: {$10^{-5}$, $10^{-6}$, $10^{-5}$, $10^{-5}$, $10^{-5}$, $10^{-6}$}
Link 103-104: {$10^{-6}$, $10^{-6}$, $10^{-5}$, $10^{-6}$, $10^{-6}$, $10^{-6}$}
Link 102-104: {$10^{-5}$, $10^{-5}$, $10^{-5}$, $10^{-5}$, $10^{-5}$, $10^{-5}$}
Link 104-105: {$10^{-6}$, $10_{-6}$, $10^{-5}$, $10^{-6}$, $10^{-6}$, $10^{-6}$}

In this case, when the link 102-105 is set to the normal path, a redundant path is set using the path control processing according to the present invention. When correlation coefficients are calculated using the correlation management unit 206, the correlation with the link 102-105 of the normal path is obtained as follows. As a result, the link 102-104-105 is selected for the redundant path.

Link 102-103: 1.0
Link 103-105: 0.71
Link 103-104: −0.45
Link 102-104: 0.0
Link 104-105: −0.45

Eighth Exemplary Embodiment

An eighth exemplary embodiment describes a case of using a history of a modulation mode and a history of a radio wave environment.

A description is made of a case of calculating a correlation of the radio wave environment to calculate a correlation between links when the history of the modulation mode of the both links, the correlation of which is to be calculated, is constant and not changed (when the same modulation method is continuously used).

When both the links A and B continuously use 16 QAM as the modulation mode, the correlation coefficient of the history of the modulation mode is 1. When the histories of the BER of the links A and B are represented by ($10^{-5}$, $10^{-6}$, $10^{-7}$, $10^{-6}$) and ($10^{-7}$, $10^{-6}$, $10^{-5}$, $10^{-5}$), respectively, a correlation coefficient of −0.664 is obtained. Accordingly, the correlation of the BER is actually used in place of the modulation mode.

In this case, it is possible to employ a method of calculating both correlation coefficients and using a larger value.

Ninth Exemplary Embodiment

A ninth exemplary embodiment describes a case of using a history of a modulation mode and a correlation of a change in the modulation mode.

In the case of calculating a correlation coefficient of the link 102-105, a correlation coefficient of the modulation mode itself and a correlation coefficient of a change in the modulation mode are calculated, thereby obtaining different correlation. Examples thereof are shown below.

Each correlation coefficient of the modulation mode itself is obtained as follows.

Link 102-103: 1.0
Link 103-105: 0.89
Link 103-104: −0.89
Link 102-104: −0.8
Link 104-105: −0.89

Each correlation coefficient of a change in the modulation mode is obtained as follows.

Link 102-103: 1.0
Link 103-105: 0.87
Link 103-104: −0.87
Link 102-104: −0.38
Link 104-105: −0.87

In this case, a larger value of the correlation coefficient of the modulation mode itself and the correlation value of a change in the modulation mode is used for each link to select correlation shown below.

Link 102-103: 1.0
Link 103-105: 0.89
Link 103-104: −0.87
Link 102-104: −0.38
Link 104-105: −0.87

As described above, according to any one of the above exemplary embodiments, it is possible to maintain the communication quality of any traffic by controlling paths using a correlation therebetween in a network including links, such as wireless links, the transmission rate of which varies depending on external factors.

Specifically, the path control device calculates a correlation coefficient of communication quality between wireless links constituting the network, thereby setting a path. The path is selected using links having a high correlation. This makes it possible to suppress an effect of a reduction in transmission rate on the path.

Furthermore, wireless links having a negative correlation or no correlation with the wireless links used in the normal path are used for the redundant path. This prevents the transmission rates of the normal path and the redundant path from decreasing at the same time in the case where the transmission rates vary.

The present invention has been described above with reference to exemplary embodiments, but the present invention is not limited to the above exemplary embodiments. The configuration and details of the present invention can be modified in various manners which can be understood by those skilled in the art within the scope of the present invention. Further, a combination of the above exemplary embodiments can be implemented within a range which can be easily recognized by those skilled in the art.

INDUSTRIAL APPLICABILITY

The present invention is applicable to a wireless broadband system and a mobile network system including wireless links.

This application is based upon and claims the benefit of priority from Japanese patent application No. 2009-100008, filed on Apr. 16, 2009, the disclosure of which is incorporated herein in its entirety by reference.

REFERENCE SIGNS LIST

101, 900 PATH CONTROL DEVICE
102, 103, 104, 105, 800 COMMUNICATION DEVICE
201 COMMUNICATION UNIT
202 PATH SELECTION UNIT
203 TRAFFIC INFORMATION MANAGEMENT UNIT
204 TOPOLOGY INFORMATION MANAGEMENT UNIT
205 LINK INFORMATION MANAGEMENT UNIT
206 CORRELATION MANAGEMENT UNIT
301, 302, 303 WIRELESS COMMUNICATION UNIT
304 PACKET PROCESSING UNIT
305 PATH LIST MANAGEMENT UNIT
306 LINK CONDITION MANAGEMENT UNIT
901 INFORMATION MANAGEMENT UNIT
902 PATH SELECTING UNIT

The invention claimed is:

1. A path control device for a plurality of wireless links connecting a plurality of communication devices, the path control device comprising:
   an information management unit that is implemented as a hardware component and that stores a correlation of communication quality between the plurality of wireless links; and
   a path selecting unit that is implemented as a hardware component and that selects a path of a flow using the correlation of communication quality between the plurality of wireless links,
   wherein the path selecting unit divides the plurality of wireless links into a plurality of groups according to a magnitude of a correlation of communication quality between the wireless links, and selects a normal path of the flow using wireless links belonging to the same group, the information management unit calculates a correlation coefficient between the wireless link used for the normal path and another wireless link by using communication qualities of the plurality of wireless links, and the path selecting unit selects a redundant path as the path of the flow from among wireless links having a correlation coefficient equal to or smaller than a predetermined threshold with a wireless link used for the normal path.

2. The path control device according to claim 1, wherein the path selecting unit selects a normal path and a redundant path as paths of the flow.

3. The path control device according to claim 1, wherein the communication quality includes a history of a modulation mode used in the plurality of wireless links.

4. The path control device according to claim 3, wherein the history of the modulation mode used includes at least one of a history correlating the modulation mode with a value, and a history correlating a change in the modulation mode with a value.

5. The path control device according to claim 3, wherein when a normal path includes a plurality of wireless links, the information management unit selects, as the communication quality, a modulation mode with a lowest transmission rate for each time, and calculates a correlation coefficient using the communication quality selected.

6. The path control device according to claim 1, wherein the communication quality includes a history of information indicating a radio wave environment of the plurality of wireless links.

7. The path control device according to claim 6, wherein the information indicating the radio wave environment includes at least one of bit error rate (BER), signal-to-noise ratio (SNR), and carrier-to-interference-plus-noise ratio (CINR).

8. The path control device according to claim 6, wherein when a normal path includes a plurality of wireless links, the information management unit selects, as the communication quality, a worst radio wave environment for each time, and calculates a correlation coefficient using the communication quality selected.

9. A path control system comprising:
a plurality of communication devices that communicate with each other using a plurality of wireless links; and
a path control device that selects a path of a flow using a correlation of communication quality between the plurality of wireless links,
wherein the path control device includes a path selecting means which divides the plurality of wireless links into a plurality of groups according to a magnitude of a correlation of communication quality between the wireless links, and selects a normal path of the flow using wireless links belonging to the same group,
the path control device calculates a correlation coefficient between the wireless link used for the normal path and another wireless link by using communication qualities of the plurality of wireless links, and
the path selecting unit selects a redundant path as the path of the flow from among wireless links having a correlation coefficient equal to or smaller than a predetermined threshold with a wireless link used for the normal path.

10. The path control system according to claim 9, wherein the path control device is mounted in at least one of the plurality of communication devices.

11. A path control method for a network in which a plurality of communication devices communicate with each other using a plurality of wireless links, the path control method comprising:
selecting a path of a flow using a correlation of communication quality between the plurality of wireless links,
wherein the selecting the path includes dividing the plurality of wireless links into a plurality of groups according to a magnitude of a correlation of communication quality between the wireless links, selecting a normal path of the flow using wireless links belonging to the same group, calculating a correlation coefficient between the wireless link used for the normal path and another wireless link by using communication qualities of the plurality of wireless links, and selecting a redundant path as the path of the flow from among wireless links having a correlation coefficient equal to or smaller than a predetermined threshold with a wireless link used for the normal path.

12. A non-transitory computer readable medium storing a program for controlling a path of a network in which a plurality of communication devices communicate with each other using a plurality of wireless links, the program causing a computer to execute processing for selecting a path of a flow using a correlation of communication quality between the plurality of wireless links,
wherein the selecting the path includes dividing the plurality of wireless links into a plurality of groups according to a magnitude of a correlation of communication quality between the wireless links, selecting a normal path of the flow using wireless links belonging to the same group, calculating a correlation coefficient between the wireless link used for the normal path and another wireless link by using communication qualities of the plurality of wireless links, and selecting a redundant path as the path of the flow from among wireless links having a correlation coefficient equal to or smaller than a predetermined threshold with a wireless link used for the normal path.

13. A path control device for a plurality of wireless links connecting a plurality of communication devices, the path control device comprising:
an information management unit that is implemented as a hardware component and that stores a correlation of communication quality between the plurality of wireless links; and
a path selecting unit that is implemented as a hardware component and that selects a path of a flow using the correlation of communication quality between the plurality of wireless links,
wherein the path selecting unit divides the plurality of wireless links into a plurality of groups according to a magnitude of a correlation of communication quality between the wireless links, and selects a normal path of the flow using wireless links belonging to the same group, and
the information management unit calculates a correlation coefficient between a wireless link used for the normal path and another wireless link by using communication qualities of the plurality of wireless links, and
the path selecting unit selects a redundant path as the path of the flow from among wireless links having a correlation coefficient equal to or smaller than a predetermined threshold with a wireless link used for the normal path.

* * * * *